(12) United States Patent
Strien et al.

(10) Patent No.: US 9,457,859 B2
(45) Date of Patent: Oct. 4, 2016

(54) BICYCLE TOP CAP

(71) Applicant: SHIMANO EUROPE B.V., Nunspeet (NL)

(72) Inventors: Leon Van Strien, Nunspeet (NL); Hendrikus Sebastiaan Schaapveld, Nunspeet (NL)

(73) Assignee: SHIMANO EUROPE B.V., CT Nunspeet (NL)

( * ) Notice: Subject to any disclaimer, the term of this patent is extended or adjusted under 35 U.S.C. 154(b) by 0 days.

(21) Appl. No.: 14/255,388

(22) Filed: Apr. 17, 2014

(65) Prior Publication Data

US 2015/0298758 A1     Oct. 22, 2015

(51) Int. Cl.
| | |
|---|---|
| *B62K 19/32* | (2006.01) |
| *B62J 6/18* | (2006.01) |
| *B62J 11/00* | (2006.01) |
| *B62K 21/12* | (2006.01) |
| B62J 99/00 | (2009.01) |

(52) U.S. Cl.
CPC . *B62J 6/18* (2013.01); *B62J 11/00* (2013.01); *B62K 21/12* (2013.01); *B62J 2099/0046* (2013.01)

(58) Field of Classification Search
CPC ......... B62K 21/12; B62K 21/18; F16J 13/02
USPC ........................................... 280/279; 220/327
See application file for complete search history.

(56) References Cited

U.S. PATENT DOCUMENTS

| | | | |
|---|---|---|---|
| 6,126,323 A * | 10/2000 | Tange | 384/545 |
| 6,149,174 A * | 11/2000 | Bohn | 424/49 |
| 6,303,248 B1 * | 10/2001 | Peterson | 429/177 |
| 6,431,575 B2 * | 8/2002 | Campagnolo | 280/279 |
| 6,612,599 B2 * | 9/2003 | Miyoshi | 280/283 |
| 6,616,165 B2 * | 9/2003 | Tsuji | 280/288.4 |
| 6,983,949 B2 | 1/2006 | Ueno et al. | |
| 7,017,929 B2 | 3/2006 | Horiuchi | |
| 7,080,848 B2 | 7/2006 | Hara et al. | |
| 7,093,844 B2 | 8/2006 | Horiuchi | |
| 8,386,127 B2 | 2/2013 | Song et al. | |
| 2003/0230228 A1 * | 12/2003 | Kinoshita | 116/28 R |
| 2004/0188976 A1 * | 9/2004 | Schmider | 280/279 |
| 2007/0289970 A1 | 12/2007 | Weichmann | |
| 2013/0233119 A1 | 9/2013 | Chang et al. | |

\* cited by examiner

*Primary Examiner* — Anne Marie Boehler
*Assistant Examiner* — Marlon A Arce
(74) *Attorney, Agent, or Firm* — Global IP Counselors

(57) ABSTRACT

A bicycle top cap is basically provided with a main body. The main body is configured to be disposed on an upper portion of a steering column of a bicycle frame. The main body further includes a first wire guide that opens in an exterior side surface of the main body. The first wire guide is configured to guide at least one wire to outside of the bicycle frame when the bicycle top cap is disposed on the bicycle frame.

18 Claims, 12 Drawing Sheets

BICYCLE TOP CAP

BACKGROUND

1. Field of the Invention

This invention generally relates to a bicycle top cap. More specifically, the present invention relates to a bicycle top cap that is disposed on an upper portion of a steering column of a bicycle frame.

2. Background Information

In recent years, some bicycles are provided with electrically adjustable bicycle components. Examples of some these electrically adjustable bicycle components include suspensions, derailleurs and a seatpost. Often, the electric bicycle components are manually operated by a control (input) device that is mounted to a handlebar. Typically, these electric bicycle components are connected by a network of electrical cords or electrical wires, which are designed to run along portions of the frame of the bicycle. The electrical cords or wires are used to supply power and/or to transmit electrical current from the control devices to the bicycle components for transmitting electrical control signals to operate the bicycle components. A variety of electrical cords are used to transmit electrical current or electric signals in bicycles. Conventionally, as mentioned above, these electrical cords or wires have typically been fastened along the outside of a bicycle frame and other hollow members such as the handlebars. However, more recently, electrical cords or wires are sometimes inserted inside of these hollow members to preserve an external appearance of the bicycle and for protection of the electrical cords or wires. Since the control devices are typically mounted on the handlebar, the electrical cords or wires are run from the handlebar past the steering column to the main frame of the bicycle.

SUMMARY

Generally, the present disclosure is directed to various features of a bicycle top cap that is disposed on an upper portion of a steering column of a bicycle frame. In one feature, a bicycle top cap is configured as an electronic component, e.g., a so called "electrical junction" that connects electric bicycle components such as electric derailleurs to shifters. A bicycle top cap is disclosed in the present disclosure that is especially adapted various bicycle frames.

In view of the state of the known technology and in accordance with a first aspect of the present disclosure, a bicycle top cap is provided that basically includes a main body. The main body is configured to be disposed on an upper portion of a steering column of a bicycle frame. The main body further includes a first wire guide that opens in an exterior side surface of the main body. The first wire guide is configured to guide at least one wire to outside of the bicycle frame when the bicycle top cap is disposed on the bicycle frame.

In accordance with a second aspect of the present invention, the bicycle top cap according to the first aspect is configured so that the main body includes a second wire guide configured to guide the at least one wire in a different direction from a guiding direction of the first wire guide.

In accordance with a third aspect of the present invention, the bicycle top cap according to the second aspect is configured so that the first wire guide is configured to guide the at least one wire that is guided through the second wire guide.

In accordance with a fourth aspect of the present invention, the bicycle top cap according to the second aspect is configured so that the second wire guide configured to guide the at least one wire to an interior area of the bicycle frame when the bicycle top cap is disposed on the bicycle frame.

In accordance with a fifth aspect of the present invention, the bicycle top cap according to the first aspect is configured so that the at least one wire including an electrical wire.

In accordance with a sixth aspect of the present invention, the bicycle top cap according to the fifth aspect further comprises an electric part including a circuit board configured to be electrically connected to the electrical wire.

In accordance with a seventh aspect of the present invention, the bicycle top cap according to the sixth aspect is configured so that the electric part includes an electrical junction configured to electrically connect a first bicycle electric device to a second bicycle electric device.

In accordance with an eighth aspect of the present invention, the bicycle top cap according to the seventh aspect is configured so that the electric part includes an indicator to indicate a remaining amount of a battery that supplies electrical power to at least one of the first and second bicycle electric devices.

In accordance with a ninth aspect of the present invention, the bicycle top cap according to the first aspect is configured so that the first wire guide includes a recess that is disposed along a bottom surface of the main body.

In accordance with a tenth aspect of the present invention, the bicycle top cap according to the first aspect is configured so that the first wire guide includes a pair of recesses that are disposed along a bottom surface of the main body.

In accordance with an eleventh aspect of the present invention, the bicycle top cap according to the tenth aspect is configured so that the recesses open in opposite direction of the exterior side surface of the main body.

In accordance with a twelfth aspect of the present invention, the bicycle top cap according to the second aspect is configured so that the second wire guide includes a bore that is formed in a bottom portion of the main body.

In accordance with a thirteenth aspect of the present invention, the bicycle top cap according to the twelfth aspect is configured so that the first wire guide includes a pair of recesses that are disposed along a bottom surface of the main body.

In accordance with a fourteenth aspect of the present invention, the bicycle top cap according to the thirteenth aspect is configured so that the recesses open in opposite direction of the exterior side surface of the main body.

In accordance with a fifteenth aspect of the present invention, the bicycle top cap according to the seventh aspect is configured so that at least one of the first and second bicycle electric devices includes an electric bicycle derailleur, and the electric part includes a bicycle derailleur adjustment switch configured to adjust a position of the electric bicycle derailleur.

In accordance with a sixteenth aspect of the present invention, a bicycle top cap is basically provided with a main body. The main body is configured to be disposed on an upper portion of a steering column of a bicycle frame. The main body further includes at least one wire guide that is disposed in a bottom portion of the main body. The at least one wire guide is configured to guide first and second wires to inside of the bicycle frame when the bicycle top cap is disposed on the bicycle frame.

In accordance with a seventeenth aspect of the present invention, the bicycle top cap according to the sixteenth aspect is configured so that the at least one wire guide includes a pair of wire guides configured to guide first and second wires, respectively.

Also other objects, features, aspects and advantages of the disclosed bicycle top cap will become apparent to those skilled in the art from the following detailed description, which, taken in conjunction with the annexed drawings, discloses one embodiment of the bicycle top cap.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
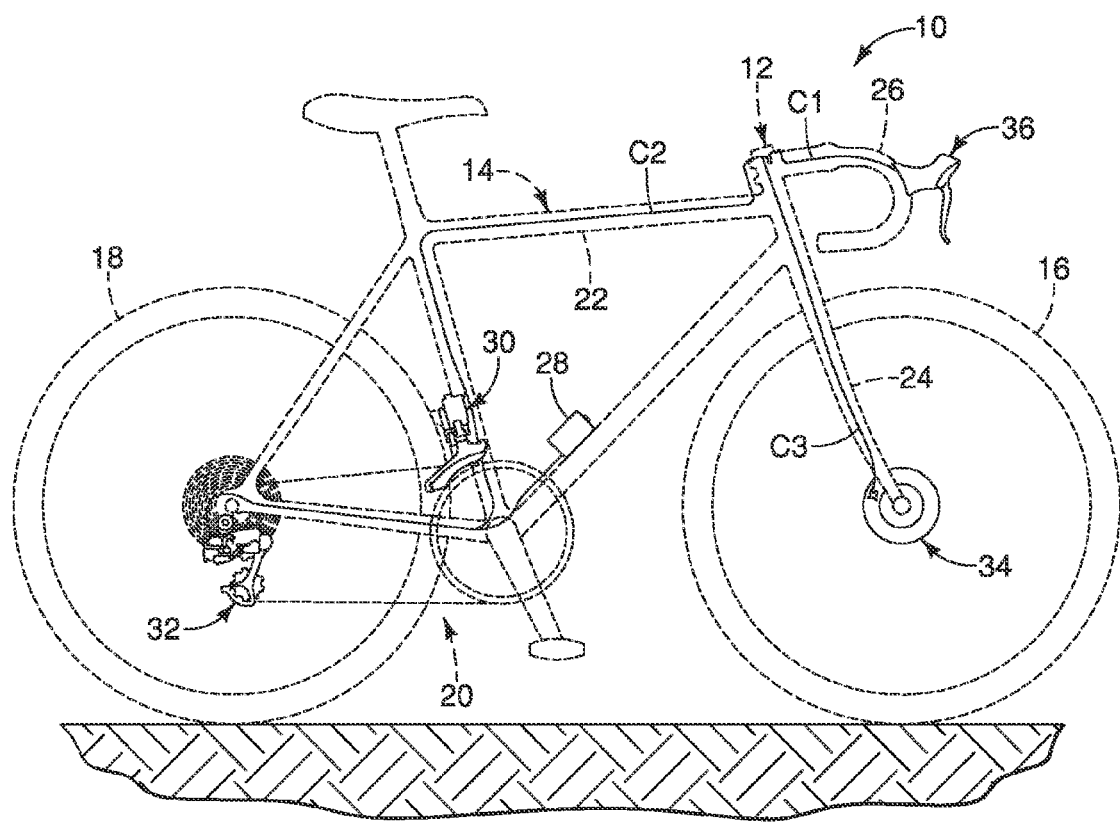
FIG. 1 is a side elevational view of a bicycle that is equipped with a bicycle component control apparatus including a bicycle top cap in accordance with one embodiment.

Referring initially to FIG. 1, a bicycle 10 is illustrated that is equipped with a bicycle top cap 12 in accordance with a first embodiment. As seen in FIG. 1, the bicycle 10 basically has a bicycle frame 14 having a front wheel 16, a rear wheel 18 and a drive train 20. The bicycle frame 14 includes a main frame body 22, a front fork 24 and a handlebar 26. The main frame body 22 is also provided with a power supply 28 (e.g., a battery), a front electric derailleur 30 (i.e., a bicycle electric device) and a rear electric derailleur 32 (i.e., a bicycle electric device). The front wheel 16 is provided with a hub generator 34.

The handlebar 26 is provided with a pair of manually operated input devices 36 (only one shown). In the illustrated embodiment, the input devices 36 are combination shifter and brake operating device, which is also called a brifter. The input devices 36 constitutes first bicycle electric devices, while the electric derailleurs 30 and 32 constitutes second bicycle electric devices that are connected to the input devices 36 (first bicycle electric devices) via the bicycle top cap 12. More specifically, a first electrical cord C1 electrically connects the input devices 36 to the bicycle top cap 12, while a second electrical cord C2 electrically connects the bicycle top cap 12 to the electric derailleurs 30 and 32 and the power supply 28. The bicycle top cap 12 is also electrically connected to the hub generator 34 by a third electrical cord C3. Thus, each of the electrical cords C1, C2 and C3 includes a plurality of electrical wires. The bicycle top cap 12 is basically provided with a main body 38. The main body 38 is configured to be disposed on an upper portion of a steering column 40 of the front fork 24 of the bicycle frame 14. In the illustrated embodiment, the main body 38 is snap-fitted into place as discussed below. Of course, the bicycle top cap 12 can be attached to the upper portion of the steering column 40 in other ways, as needed and/or desired.

Figure 2:
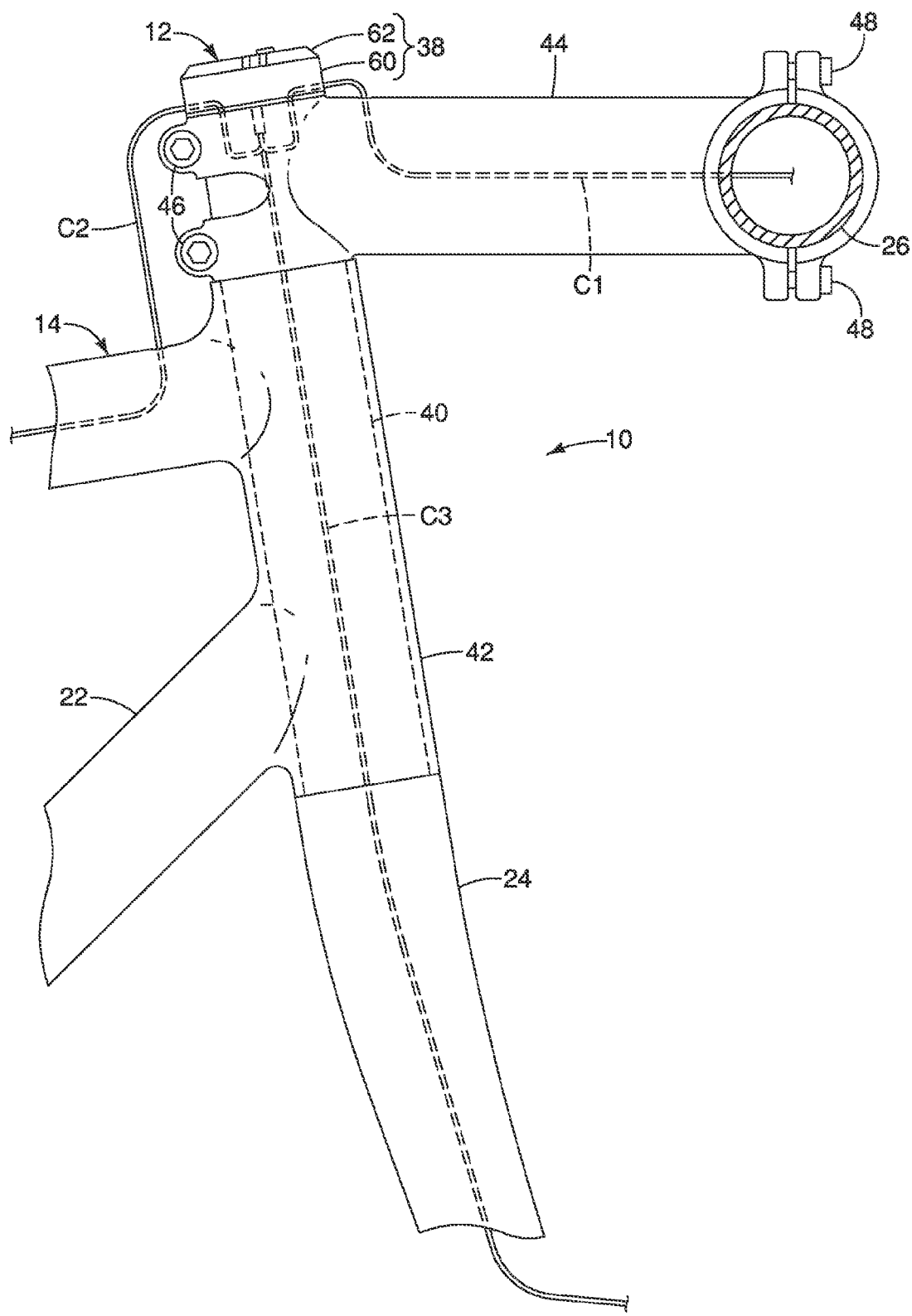
FIG. 2 is an enlarged side elevational view of a portion of a bicycle that is equipped with the bicycle top cap illustrated in FIG. 1.

As seen in FIG. 2, the front fork 24 includes a steering column 40 (also called a steerer tube) that is rotatably supported in a head tube 42 of the bicycle frame 14. The handlebar 26 is attached to an upper end portion of the steering column 40 by a handlebar stem 44. Specifically, the handlebar stem 44 is secured to the steering column 40 by a pair of bolts 46. The handlebar stem 44 rotatably secures the front fork 24 to the head tube 42 of the bicycle frame 14. Optionally, upper and lower bearing assemblies (not shown) are provided between the steering column 40 and the head tube 42. For the sake of simplicity of the drawings, the upper and lower bearing assemblies are not shown. Basically, the steering column 40 extends through the upper and lower bearing assemblies, and through the head tube 42 of the bicycle frame 14. The upper bearing assembly is sandwiched between a bottom end of the handlebar stem 44 and a top end of the head tube 42. On the other hand, the lower bearing assembly is sandwiched between a bottom end of the head tube 42 and a fork crown of the front fork 24. As seen in FIG. 2, the handlebar stem 44 also releasably secures a handlebar 26 in a conventional manner (e.g., a pair of bolts 48). Since the upper and lower bearing assemblies and the handlebar stem 44 are a conversional bicycle parts, the upper and lower bearing assemblies and the handlebar stem not be discussed in detail herein.

Figure 3:
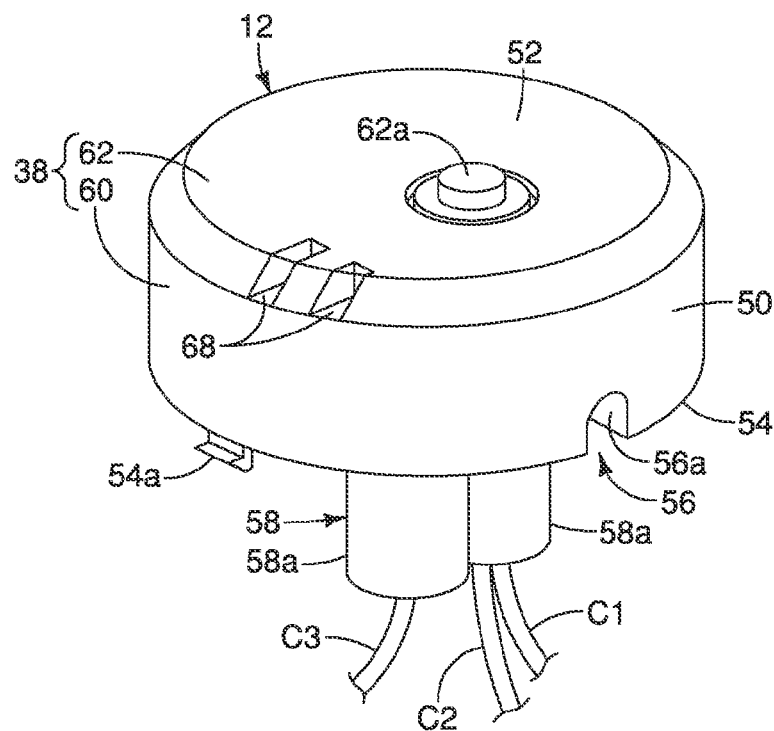
FIG. 3 is an enlarged top perspective view of the bicycle top cap illustrated in FIGS. 1 and 2.
Figure 4:
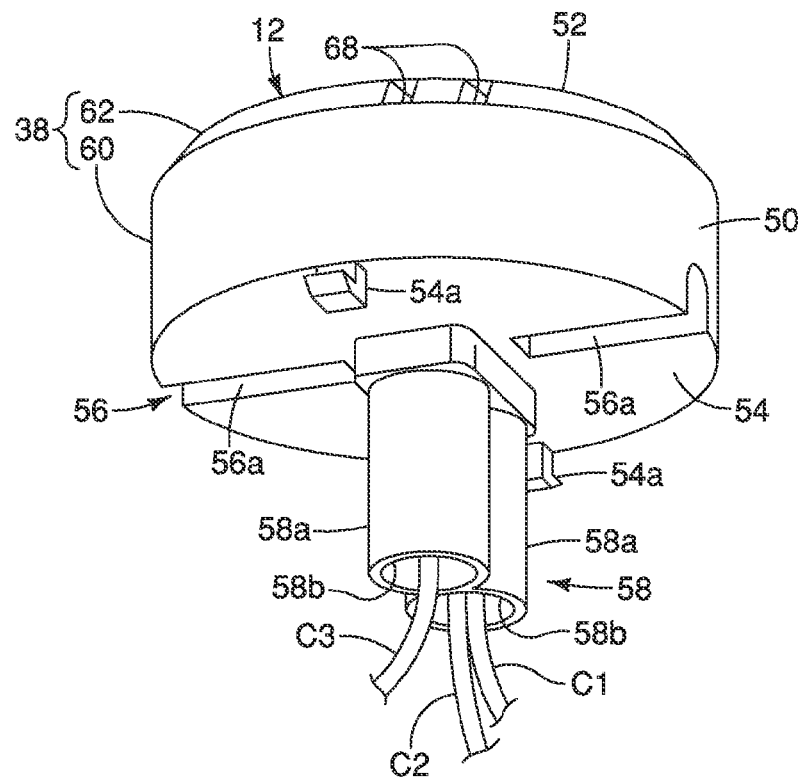
FIG. 4 is an enlarged bottom perspective view of the bicycle top cap illustrated in FIGS. 1 to 3.
Figure 5:
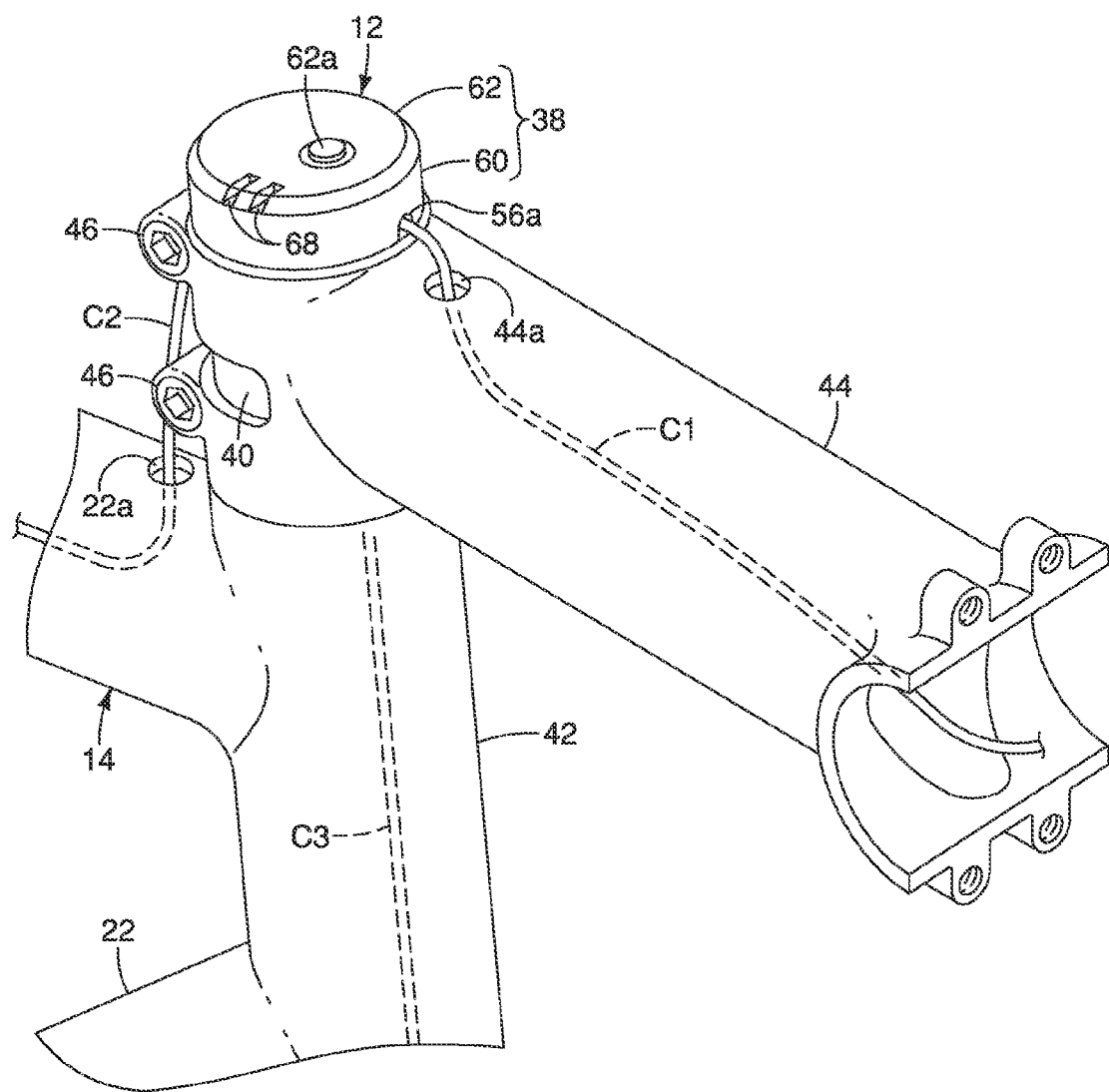
FIG. 5 is an enlarged front perspective view of the bicycle top cap illustrated in FIGS. 1 to 4, with the bicycle top cap disposed on the upper portion of the steering column of the bicycle frame.
Figure 6:
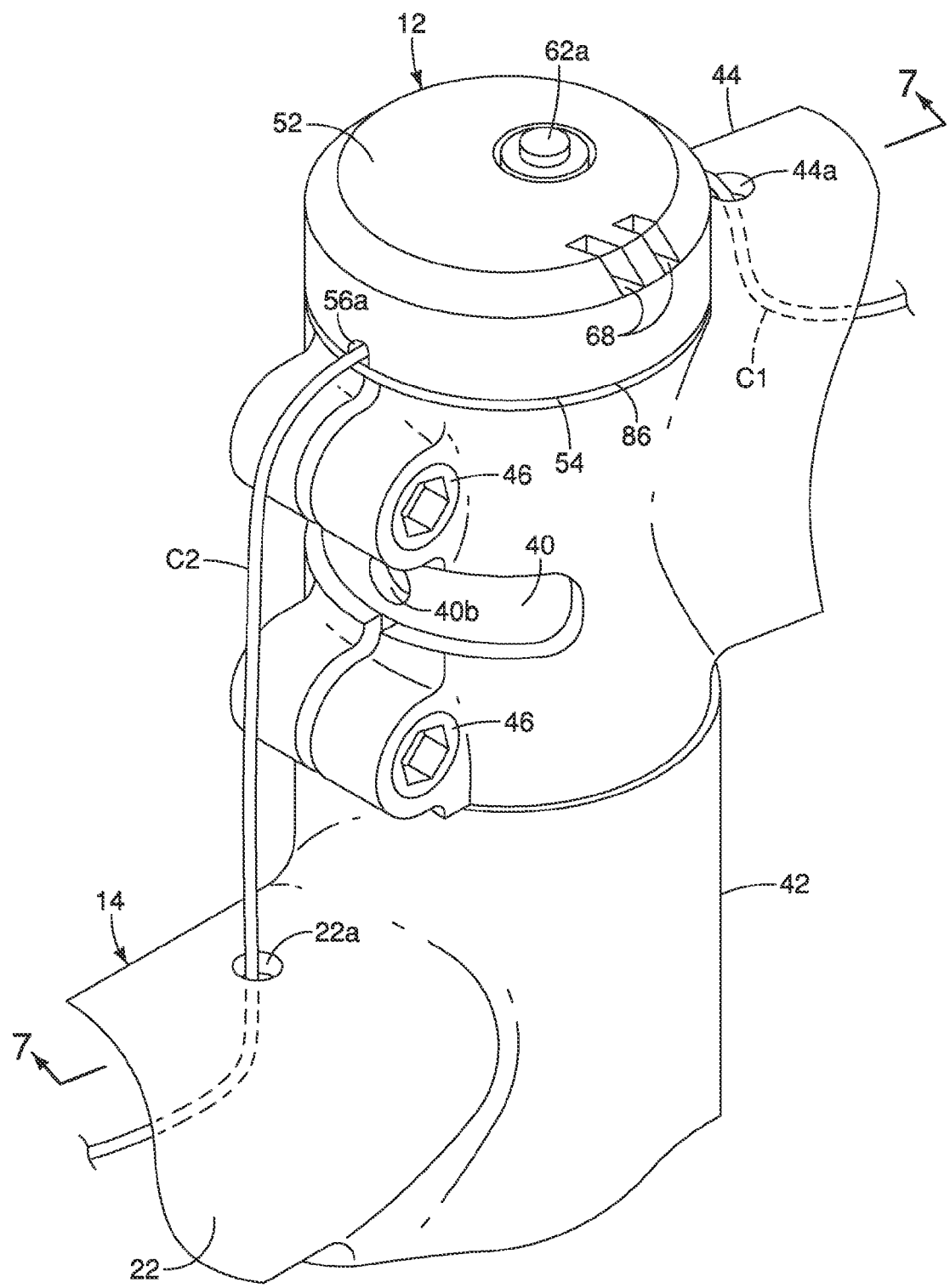
FIG. 6 is an enlarged rear perspective view of the bicycle top cap illustrated in FIGS. 1 to 5, with the bicycle top cap disposed on the upper portion of the steering column of the bicycle frame.

As seen in FIGS. 3 and 4, the main body 38 has an exterior side surface 50, an exterior top surface 52 and an exterior bottom surface 54. The exterior side surface 50 corresponds to an outer peripheral surface of the main body 38. The exterior side surface 50 is exposed to outside of the bicycle frame 14 when the bicycle top cap 12 is disposed on the bicycle frame 14. The exterior bottom surface 54 faces the upper opening of the steering column 40 and covers the opening of the handlebar stem to which the steering column 40 is attached, when the bicycle top cap 12 is disposed on the bicycle frame 14. The bottom surface 54 has a pair of snap-fit hooks 54a for securing the bicycle top cap 12 to the upper portion of the steering column 40. The main body 38 further includes a first wire guide 56 that opens in the exterior side surface 50 of the main body 38. Thus, in the illustrated embodiment, the main body 38 further includes at least one wire guide that is disposed in a bottom portion of the main body 38. The at least one wire guide is configured to guide first and second wires (i.e., the wires of the first and second electrical cords C1 and C2) to inside of the bicycle frame 14 when the bicycle top cap 12 is disposed on the bicycle frame 14. In this way, the first wire guide 56 is configured to guide at least one wire to outside of the bicycle frame 14 when the bicycle top cap 12 is disposed on the bicycle frame 14. The at least one wire includes an electrical wire.

Here, the first wire guide 56 includes a pair of recesses 56a that are disposed along the bottom surface 54 of the main body 38. The recesses 56a open in opposite direction of the exterior side surface 50 of the main body 38. In other words, preferably, the at least one wire guide (e.g., the first wire guide 56) includes a pair of wire guides (e.g., the recesses 56a) that are configured to guide first and second wires, respectively. Alternatively, the first wire guide 56 includes a single recess that is disposed along the bottom surface 54 of the main body 38. In any case, the first wire guide 56 is configured to guide at least one wire to outside of the bicycle frame 14 when the bicycle top cap 12 is disposed on the bicycle frame 14.

Still referring to FIGS. 3 and 4, the main body 38 preferably includes a second wire guide 58 that is configured to guide the at least one wire (i.e., the wires of the first, second and third electrical cords C1, C2 and C3) in a different direction from a guiding direction of the first wire guide 56. Here, the second wire guide 58 includes a pair of guide tubes 58a that extend downward from the bottom surface 54. Each of the guide tubes 58a of the second wire guide includes a bore 58b that is formed in a bottom portion of the main body 38. One of the guide tubes 58a guides the first and second electrical cords C1 and C2 and the other of the guide tubes 58a guides the third electrical cord C3. The guide directions of the recesses 56a are perpendicular to the guide directions of the guide tubes 58a. In the case of the third electrical cord C3, the second wire guide 58 is configured to guide the at least one wire to an interior area of the bicycle frame 14 when the bicycle top cap 12 is disposed on the bicycle frame 14. The second wire guide 58 communicates with an internal cavity of the housing 60, but the first wire guide 56 does not communicate with the internal cavity of the housing 60.

By using the bicycle top cap 12, a variety of wiring configurations are possible. Basically, the first wire guide 56 is configured to guide the at least one wire that is guided through the second wire guide 58. In other words, the wires of the first and second electrical cords C1 and C2 are initially guided by through the second wire guide 58 and then the wires of the first and second electrical cords C1 and C2 bend upwardly and are guided by the first wire guide 56 to outside of the main body 38. On the other hand, the wires of the third electrical cord C3 are only guided by the second wire guide 58 to an interior portion of the bicycle frame 14.

Figure 7:
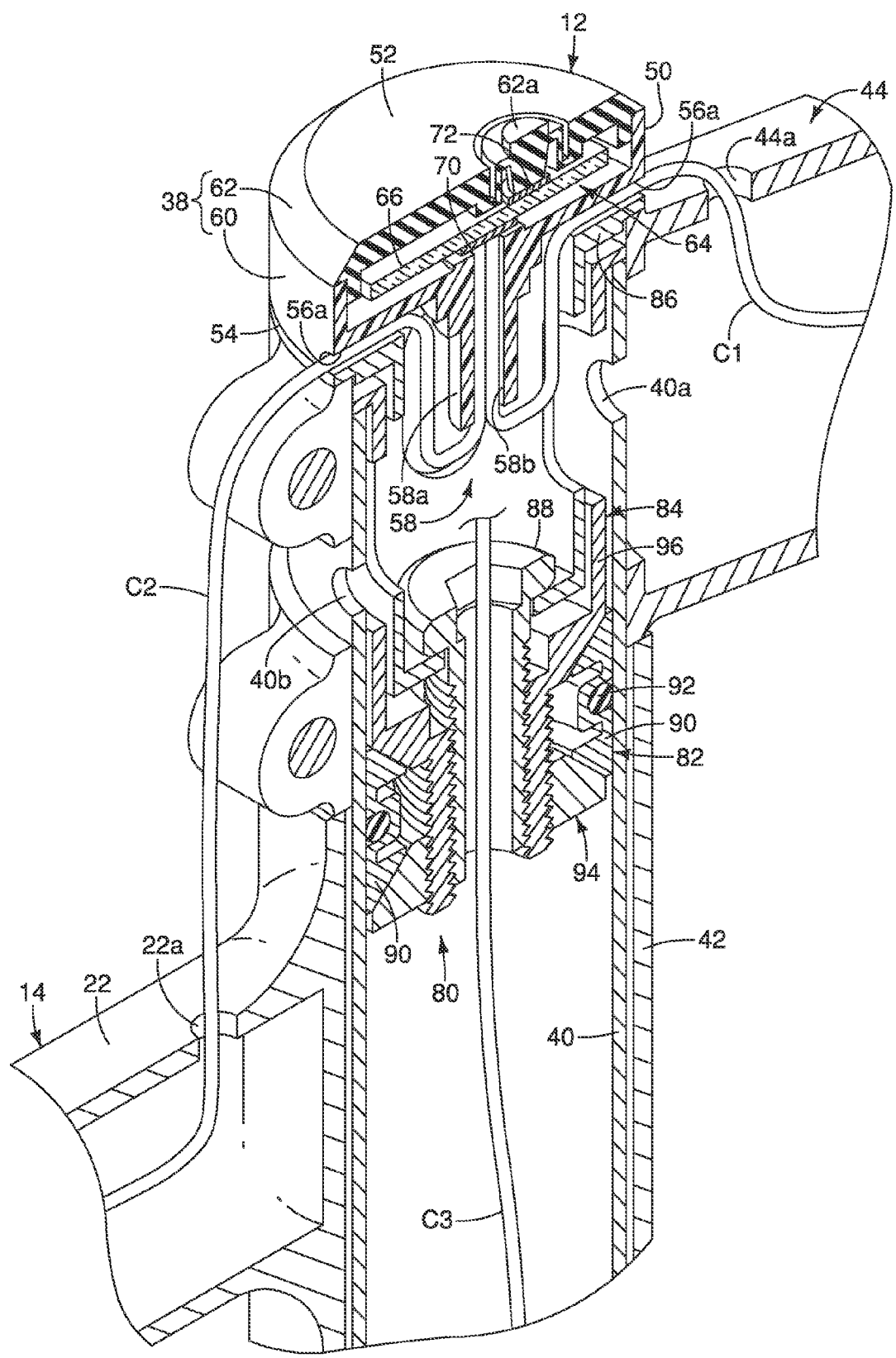
FIG. 7 is a center cross sectional view of a portion of the bicycle frame with an expander disposed in the steering column, the bicycle top cap and the handlebar stem as seen along section line 7-7 of FIG. 6, with the electrical cords in a first wiring configuration.
Figure 8:
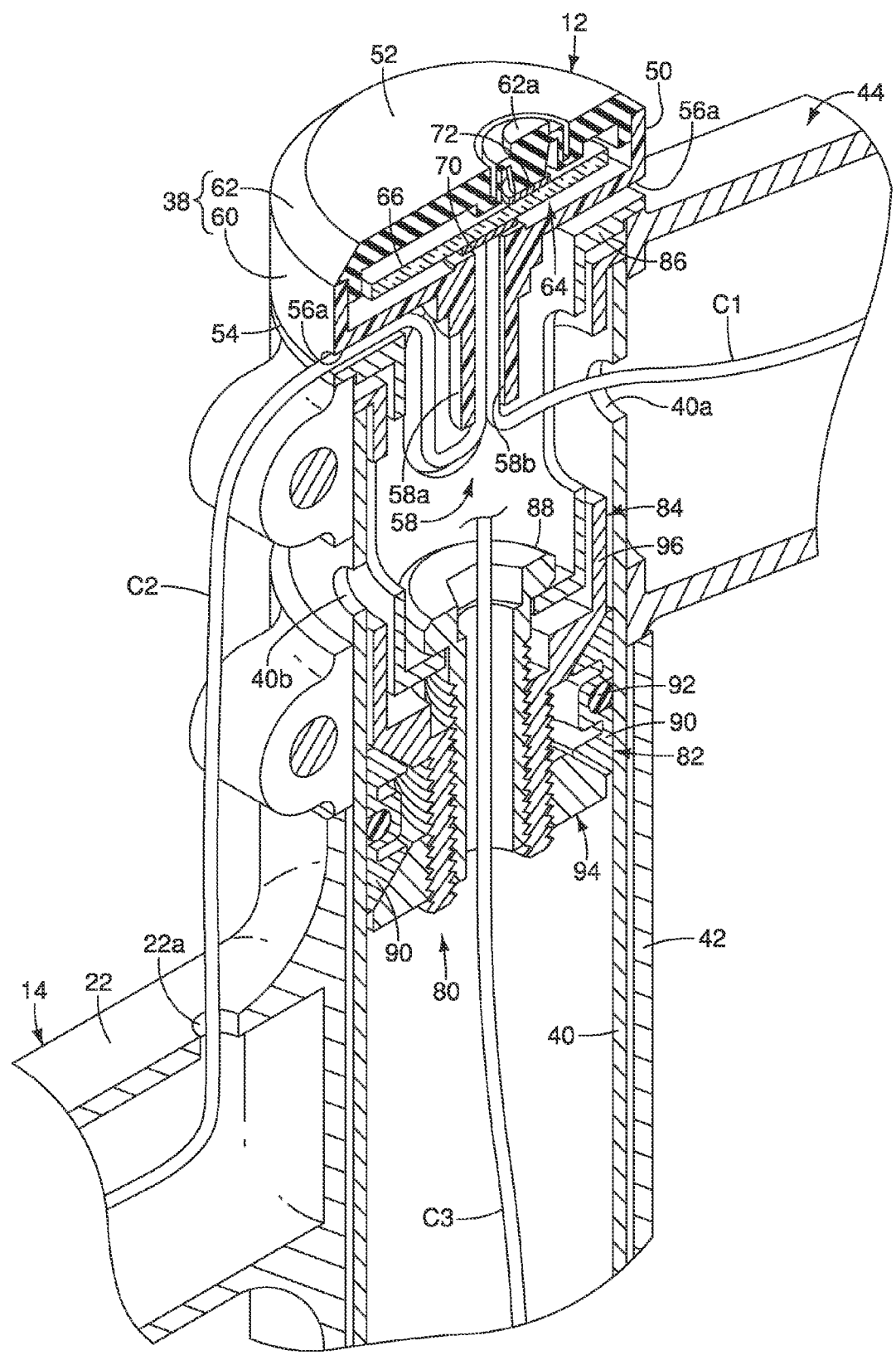
FIG. 8 is a center cross sectional view, corresponding to FIG. 7, of a portion of the bicycle frame, the bicycle top cap and the handlebar stem, with the electrical cords in a second wiring configuration.
Figure 9:
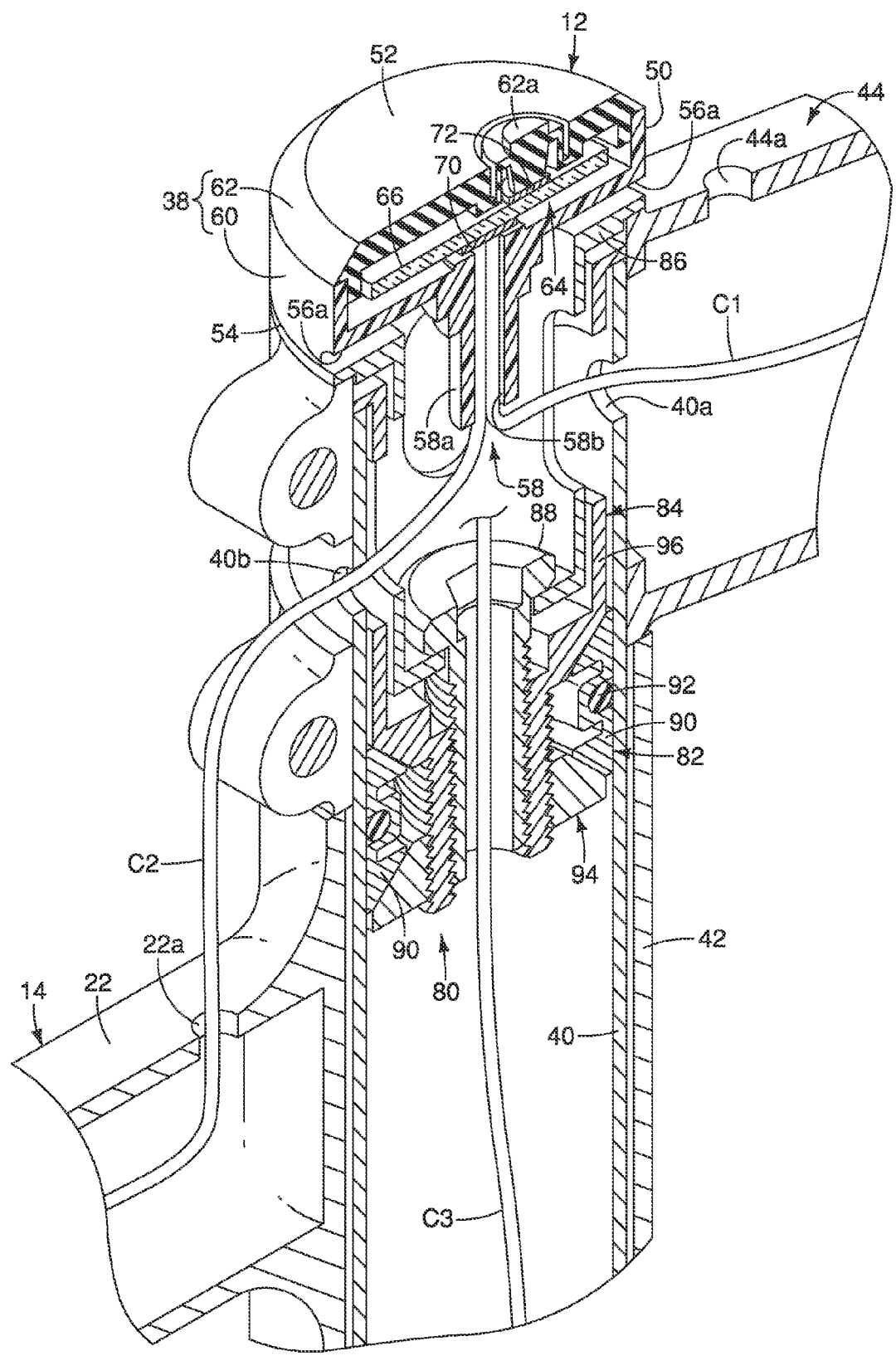
FIG. 9 is a center cross sectional view, corresponding to FIGS. 7 and 8, of a portion of the bicycle frame, the bicycle top cap and the handlebar stem, with the electrical cords in a third wiring configuration.

Depending on the bicycle frame, the electrical cords C1, C2 and C3 can be routed in a variety of ways. For example, FIG. 7 illustrates in a first wiring configuration in which the electrical cords C1 and C2 extend in opposite directions from the bicycle top cap 12. In the first wiring configuration, the electrical cord C1 enters the handlebar stem 44 through an opening 44a that is disposed at an upper surface of the handlebar stem 44. The electrical cord C1 can then be routed into the handlebar 26 as seen in FIG. 1. Alternatively, the electrical cord C1 can be routed along the exteriors of the handlebar stem 44 and the handlebar 26. In the first wiring configuration, the electrical cord C2 enters the main frame body 22 through an opening 22a that is disposed at an upper surface of the main frame body 22 (a top tube). The electrical cord C2 can then be routed to battery and the electric derailleurs 30 and 32 as seen in FIG. 1. Alternatively, the electrical cord C2 can be routed along the exterior of bicycle frame 14. In the first wiring configuration, the electrical cord C3 extends downwardly inside the front fork 24 to an opening (not shown) that is adjacent the hub generator 34. FIG. 8 illustrates in a second wiring configuration in which the electrical cord C1 exits the steering column 40 through the opening 40a, while the electrical cord C2 extend along one of the recesses 56a. FIG. 9 illustrates in a third wiring configuration in which the electrical cords C1 and C2 exits the steering column 40 through the openings 40a and 40b, respectively. Of course, other wiring configurations can be used depending on the configuration of the bicycle frame. In the first wiring configuration, the electrical cord C1 and C2 are guided to outside of the bicycle frame 14 via the first wire guide 56, and then passes through the upper opening of the steering column 40. Therefore when the handlebar stem 44 is twisted relative to the steering column 40 (i.e., when the bicycle fall down), the electrical cord C1 and C2 are not pulled between the handlebar stem 44 and steering column 40. In this way, the first wire guide 56 can prevent the electrical cord C1 and C2 from breaking.

In the illustrated embodiment, the main body 38 includes a first housing part 60 and a second housing part 62. The first housing part 60 is a cup shaped member that is formed of a suitable material such as a hard plastic. The second housing part 62 is configured as a lid of the first housing part 60. Here, the second housing part 62 is constructed of an elastomeric material that is press-fitted into the first housing part 60. Of course, the first and second housing parts 60 and 62 can be formed of other suitable materials. The first and second housing parts 60 and 62 are configured to define a housing for an electric part 64.

The electric part 64 includes a printed circuit board 66 that is configured to be electrically connected to the electrical wires of the electrical cords C1, C2 and C3. The electric part 64 includes an indicator 68 to indicate a remaining amount of the battery 28 that supplies electrical power to at least one of the first and second bicycle electric devices (e.g., the input devices 36 and the electric derailleurs 30 and 32). Here, the indicator 68 is formed by a pair of LED lights that are located in the exterior top surface 52 of the main body 38. The indicator 68 is electrically connected to the battery 28 via the printed circuit board 66. The printed circuit board 66 of the electric part 64 includes an electrical junction 70 that is configured to electrically connect a first bicycle electric device (e.g., the input devices 36) to a second bicycle electric device (e.g., the electric derailleurs 30 and 32). In the illustrated embodiment, at least one of the first and second bicycle electric devices includes an electric bicycle derailleur. In the case where the bicycle top cap 12 is electrically coupled to an electric bicycle derailleur, the electric part 64 includes a bicycle derailleur adjustment switch 72 that is configured to adjust a position of the electric bicycle derailleur. The bicycle derailleur adjustment switch 72 is a contact switch that is disposed on the printed circuit board 66 electrically connected to the electric derailleurs 30 and 32 via the printed circuit board 66. In the illustrated embodiment, the second housing part 62 includes a user push button 62a that is arranged to contact the bicycle derailleur adjustment switch 72 when the user push button 62a is depressed by a user. Here, the user push button 62a is integrally formed with the remainder of the second housing part 62 as a one-piece, unitary member. In particular, a living hinge (an area of reduced material) is provided around the user push button 62a to provide the flexibility for the user push button 62a to active the bicycle derailleur adjustment switch 72 when the user push button 62a is depressed by a user.

As seen in FIGS. 7 to 10, the bicycle top cap 12 is coupled to the steering column 40 by an expander 80. The expander 80 is designed to be anchored inside the steering column 40 and prevent axial movement of the handlebar stem 44 with respect to the steering column 40. In the illustrated embodiment, the main body 23 is snap-fitted onto expander 80 as discussed below. Of course, the bicycle top cap 12 can be disposed on the upper portion of the steering column 40 in other ways, as needed and/or desired.

Figure 10:
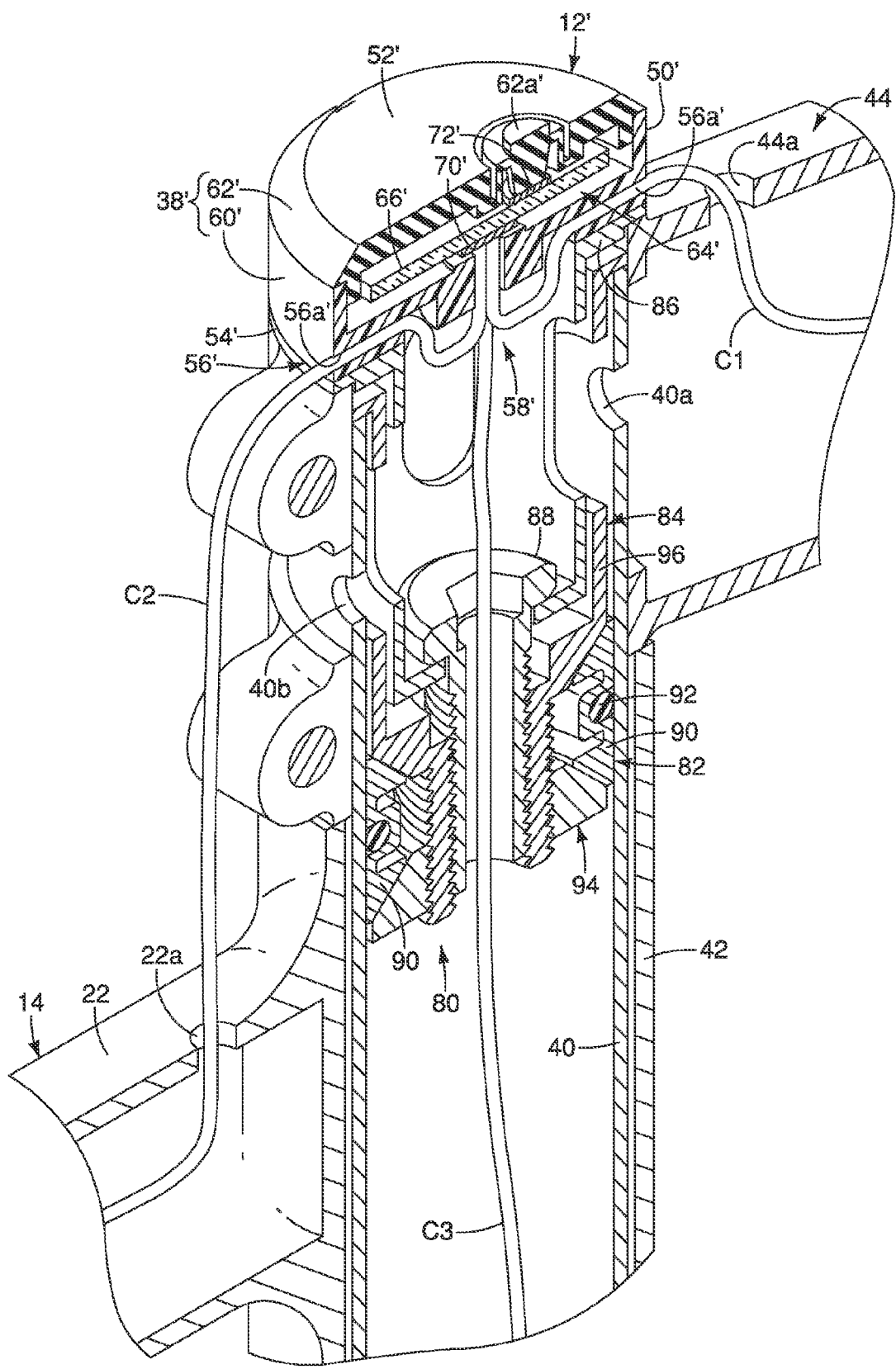
FIG. 10 is a center cross sectional view, corresponding to FIGS. 7, 8 and 9, of a bicycle top cap having a modified construction that is installed in a portion of the bicycle frame, with the electrical cords in a wiring configuration similar to the first wiring configuration.

Referring now to FIG. 10, a bicycle top cap 12' is illustrated in conjunction with the expander 80. The bicycle top cap 12' is identical to the bicycle top cap 12, except that the bicycle top cap 12' wire guides have been modified. In view of the similarity between the bicycle top caps 12 and 12', the descriptions of the parts of the bicycle top cap 12' that are identical to the parts of the bicycle top cap 12 may be omitted for the sake of brevity.

Similar to the first embodiment, the bicycle top cap 12' includes a main body 38' that is configured to be disposed on an upper portion of the steering column 40 of the front fork 24 of the bicycle frame 14. The main body 38' has an exterior side surface 50', an exterior top surface 52' and an exterior bottom surface 54'. The main body 38' has a first wire guide 56' that includes a pair of openings 56a' formed in the side surface 50'. The main body 38' preferably includes a second wire guide 58' that is in the form of an opening in the bottom surface 54' of the main body 38'. The second wire guide 58' does not include the guide tubes 58a. The main body 38' includes a first housing part 60' and a second housing part 62'. The first and second housing parts 60 and 62 enclose an electric part 64' that is identical to the electric part 64 that is discussed above. The pair of the openings 56a' communicates with an internal cavity of the first housing part 60' so that the electrical cords C1 and C2 can be directly guided from the electrical part 64' to outside of the bicycle frame 14 via the first housing part 60'.

Figure 11:
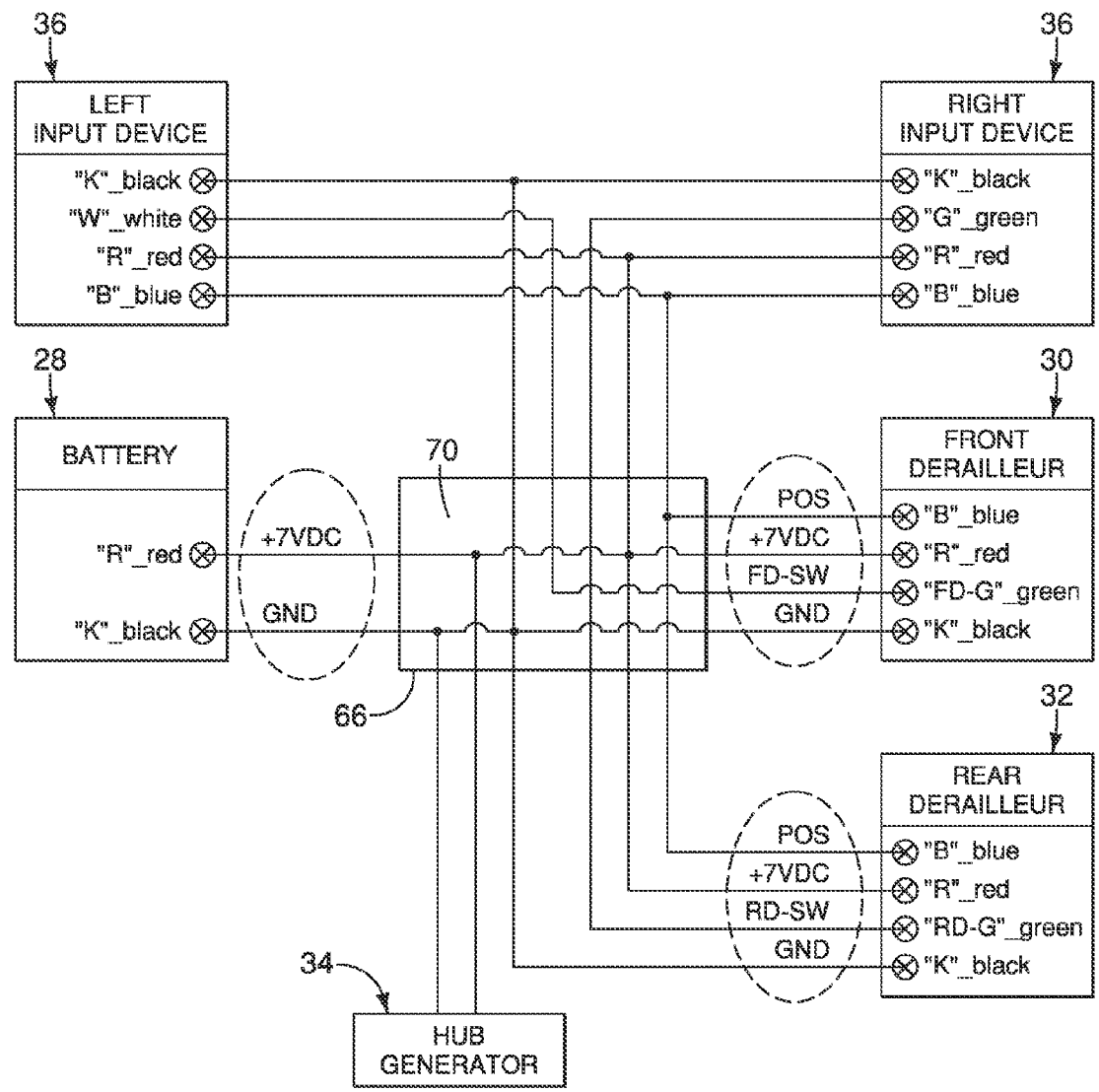
FIG. 11 is a wiring schematic diagram of the bicycle top cap electrically connected to the electric bicycle components of an electrically controlled shifting system illustrated in FIG. 1.
Figure 12:
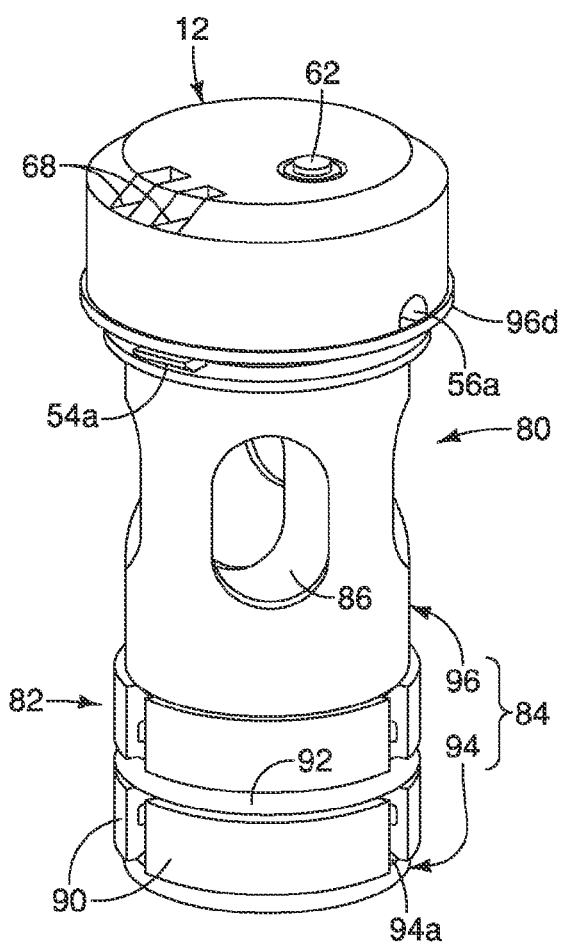
FIG. 12 is a perspective view of a combination expander and top cap in which the top cap can be either the bicycle top cap of FIGS. 1 to 9 or the bicycle top cap of FIG. 10, and in which the expander corresponds to the expander illustrated in FIGS. 7 to 10.
Figure 13:
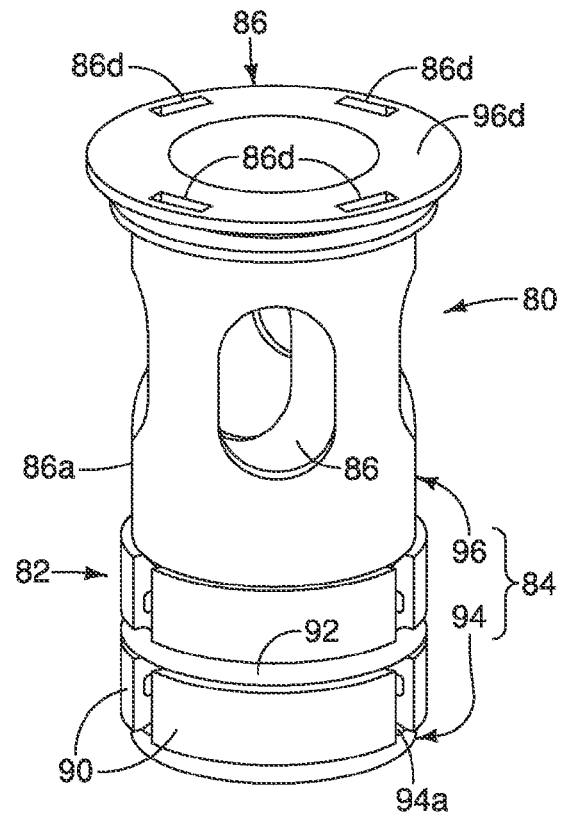
FIG. 13 is a perspective view of the expander illustrated in FIG. 12 and top cap in which the top cap can be either the bicycle top cap of FIGS. 1 to 9 or the bicycle top cap of FIG. 10.
Figure 14:
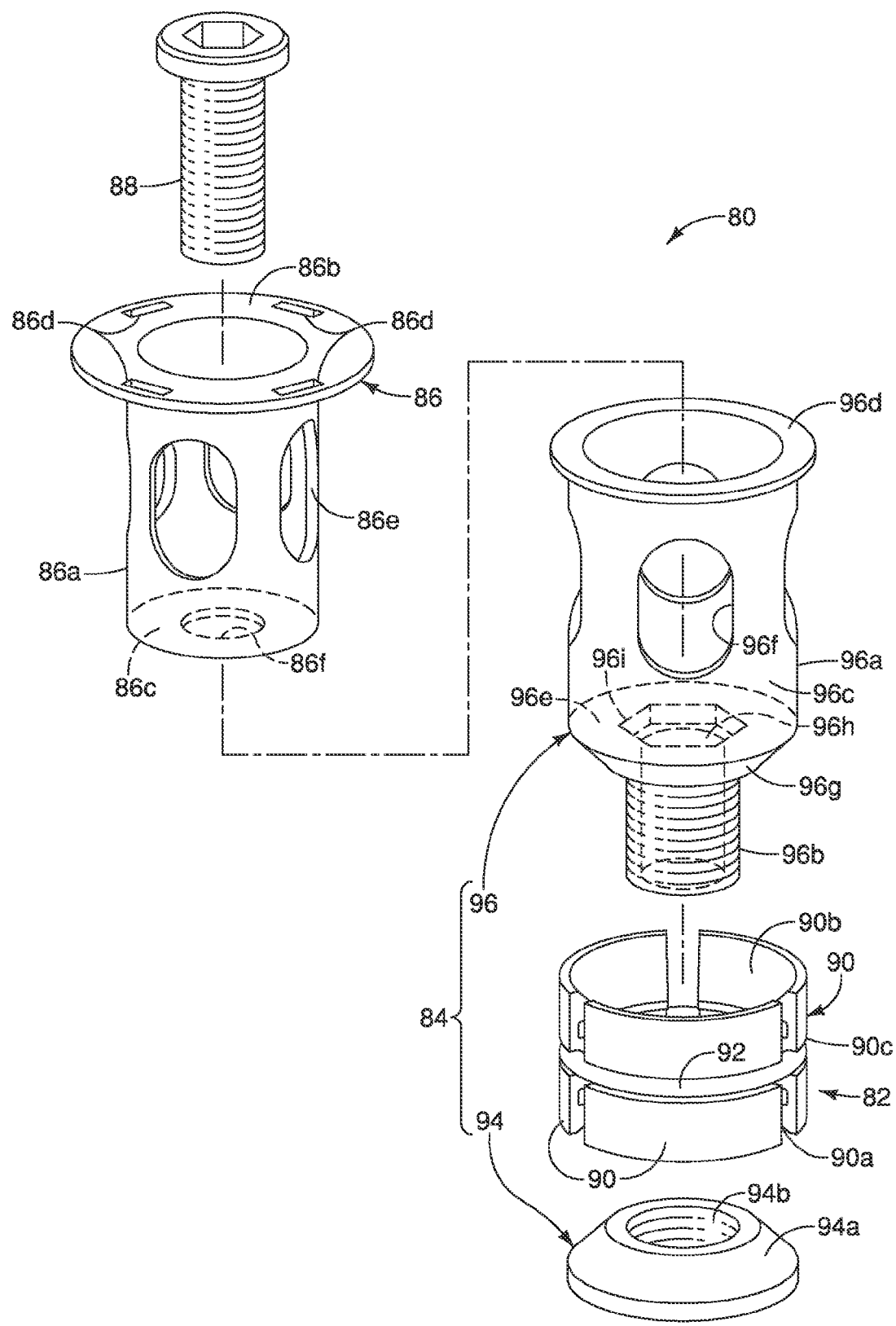
FIG. 14 is an exploded perspective view of the expander illustrated in FIGS. 12 and 13.

Referring now to FIG. 11, the electrical junction 70 of the printed circuit board 66 is diagrammatically illustrated. Here, separate signal lines are illustrated for sending control signals from the input devices 36 to the derailleurs 30 and 32. However, alternately, a power line communication (PLC) arrangement can be utilized to send control signals from the input devices 36 to the derailleurs 30 and 32. Also here, the electrical junction 70 directs electrical power from the battery 28 to the electrically devices (i.e., the front electric derailleur 30, the rear electric derailleur 32 and the input devices 36). The hub generator 34 is electrically connected to the electrically devices (i.e., the front electric derailleur 30, the rear electric derailleur 32 and the input devices 36) via the electrical junction 70 for supplying electrical power generated by the hub generator 34 to the electrically devices (i.e., the front electric derailleur 30, the rear electric derailleur 32 and the input devices 36). Also the hub generator 34 is electrically connected to the battery 28 for recharging the battery 28. The printed circuit board 66 preferably includes a controller (not shown) for controlling the flow of electrical power from the hub generator 34 to the battery and/or the electrically devices. This controller (not shown) can also include a control bicycle derailleur adjustment program that is operated in response to depression of the bicycle derailleur adjustment switch 72. One example of a position adjustment method of an electric bicycle derailleur is disclosed in U.S. Pat. No. 7,805,268, which is assigned to Shimano Inc. Alternatively, the controller can be located remotely from the bicycle top cap 12.

Referring now to FIGS. 7 to 10 and 12 to 14, the bicycle 10 further includes an expander 80 that is designed to be anchored inside the steering column 40 and prevent axial movement of the handlebar stem 44 with respect to the steering column 40. Basically, the expander 80 includes an expander body 82, an expanding structure 84, a head cap 86 and a hollow fastening bolt 88. Basically, the expanding structure 84 is operatively connected to the expander body 82 to vary the effective diameter of the expander body 82. By varying the effective diameter of the expander body 82, the expander body 82 engages an interior surface (i.e., an inner circumferential surface) of the steering column 40. Thus, the expander 80 is secured to the interior surface of the steering column 40.

The expander body 82 includes three wedge blocks 90 and an elastic band 92. The elastic band 92 biases the wedge blocks 90 toward a radially inward direction of the expander body 82. Preferably, each of the wedge blocks 90 includes a lower expansion surface 90a, an upper expansion surface 90b and an outer peripheral surface 90c. The outer peripheral surface 90c is a curved arc shaped surface that contacts the interior surface of the steering column 40.

The expanding structure 84 includes a first pressure member 94 and a second pressure member 96. The second pressure member 96 moves with respect to the first pressure member 94 to vary the effective diameter of the expander body 82. More specifically, the first and second pressure members 94 and 96 move closer to each other to expand the effective diameter of the expander body 82 by moving the wedge blocks 90 radially outward with respect to a center longitudinal axis of the expander 80. Also the first and second pressure members 94 and 96 move farther apart from each other to contract the effective diameter of the expander body 82 by moving the wedge blocks 90 radially inward with respect to the center longitudinal axis of the expander 80.

In the illustrated embodiment, the first pressure member 94 is preferably provided as a pressure nut, and the second pressure member 96 is preferably provided as a pressure bolt. The first pressure member 94 has an expansion surface 94a and a threaded hole 94b. The expansion surface 94a that is a conical surface for engaging the expansion surfaces 90a of the wedge blocks 90 of the expander body 82. The second pressure member 96 has a tubular head 96a and an externally threaded shaft 96b. The tubular head 96a of the second pressure member 96 has a tubular portion 96c, an annular flange portion 96d and an end wall 96e. The tubular portion 96c, the annular flange portion 96d and the end wall 96e are integrally formed as a one-piece, unitary member from a suitable rigid material such as a lightweight metal or a fiber reinforced plastic. The tubular portion 96c has a plurality of openings 96f for the electrical cords C1, C2 and C3 to pass therethrough in order to extend into an interior area of the frame 14 or the handlebar stem 44. The annular flange portion 96d extends radially outward from one end of the tubular portion 96c to define an abutment or shoulder that contacts the upper edge of the steering column 40. The end wall 96e extends radially inward from the other end of the tubular portion 96c to the threaded shaft 96b. The end wall 96e has an expansion surface 96g that is a conical surface for engaging the expansion surfaces 90b of the wedge blocks 90 of the expander body 82. The threaded shaft 96b has a centrally located threaded bore 96h. The fastening bolt 88 is threaded into the threaded bore 96h for securing the head cap 86 to the expanding structure 84 after the wedge blocks 90 are secured against the interior surface of the steering column 40. The end wall 96e has a hexagonal counterbore 96i that is configured to receive a tool for rotating the second pressure member 96 in order to screw the second pressure member 96 into the first pressure member 94.

Basically, the externally threaded shaft 96b of the second pressure member 96 is screwed into the threaded hole 94b of the first pressure member 94 (i.e., the pressure nut). As a result of this screwing action between the first and second pressure members 94 and 96, the expansion surfaces 94a and 96g of the first and second pressure members 94 and 96 engage the expansion surfaces 90a and 90b of the wedge blocks 90 of the expander body 82, respectively, to expand the wedge blocks 90 of the expander body 82 outward against the interior surface of the steering column 40. In this way, the first and second pressure members 94 and 96 are secured to the steering column 40. Then, the head cap 86 is attached to the second pressure member 96 by the fastening bolt 88.

The head cap 86 has a tubular portion 86a, an annular flange portion 86b and an end wall 86c. The tubular portion 86a, the annular flange portion 86b and the end wall 86c are integrally formed as a one-piece, unitary member from a suitable rigid material such as a lightweight metal or a fiber reinforced plastic. The tubular portion 86a has a plurality of openings 86d for the electrical cords C1, C2 and C3 to pass therethrough in order to extend into an interior area of the frame 14 or the handlebar stem 44. The annular flange portion 86b extends radially outward from one end of the tubular portion 86a to define an abutment or shoulder that contacts the upper edge of the handlebar stem 44. The annular flange portion 86b has a plurality of openings 86e for receiving the snap-fit hooks 54a of the bicycle top cap 12. The end wall 86c extends radially inward from the other end of the tubular portion 86a. The end wall 86c has a centrally located opening 86f for receiving the fastening bolt 88 therethrough. The hollow fastening bolt 88 has an opening penetrating through the center of the fastening bolt 88 in the longitudinal direction. The electrical cords C1, C2 and C3 can pass through the opening of the fastening bolt in order to extend into an interior area of the frame 14. By attaching the head cap 86 to the second pressure member 96 using the fastening bolt 88, the head cap 86 presses the handlebar stem 44 against the head tube 42 in the axial direction. Accordingly the handlebar stem 44 is secured relative to the head tube 42 in the axial direction.

In understanding the scope of the present invention, the term "comprising" and its derivatives, as used herein, are intended to be open ended terms that specify the presence of the stated features, elements, components, groups, integers and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward" "downward", "top", "bottom", "side", "vertical", "horizontal", "perpendicular" and "transverse" as well as any other similar directional terms refer to those directions of a bicycle in an upright, riding position and equipped with the bicycle top cap. Accordingly, these directional terms, as utilized to describe the bicycle top cap should be interpreted relative to a bicycle in an upright riding position on a horizontal surface and that is equipped with the bicycle top cap. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle top cap comprising:
   a main body having an exterior bottom surface configured to be disposed on an upper portion of a steering column of a bicycle frame, an exterior top surface facing an opposite direction from the exterior bottom surface, and an exterior side surface connecting the exterior bottom and top surfaces; and
   the main body further including a first wire guide that opens in the exterior side surface of the main body, the first wire guide being configured to guide at least one wire to outside of the bicycle frame when the bicycle top cap is disposed on the bicycle frame.

2. The bicycle top cap according to claim 1, wherein the main body includes a second wire guide configured to guide the at least one wire in a different direction from a guiding direction of the first wire guide.

3. The bicycle top cap according to claim 2, wherein the first wire guide is configured to guide the at least one wire that is guided through the second wire guide.

4. The bicycle top cap according to claim 2, wherein the second wire guide configured to guide the at least one wire to an interior area of the bicycle frame when the bicycle top cap is disposed on the bicycle frame.

5. The bicycle top cap according to claim 1, wherein the at least one wire including an electrical wire.

6. The bicycle top cap according to claim 5, further comprising
   an electric part including a circuit board configured to be electrically connected to the electrical wire.

7. The bicycle top cap according to claim 6, wherein the electric part includes an electrical junction configured to electrically connect a first bicycle electric device to a second bicycle electric device.

8. The bicycle top cap according to claim 7, wherein the electric part includes an indicator to indicate a remaining amount of a battery that supplies electrical power to at least one of the first and second bicycle electric devices.

9. The bicycle top cap according to claim 1, wherein the first wire guide includes a recess that is disposed along the exterior bottom surface of the main body.

10. The bicycle top cap according to claim 2, wherein the second wire guide includes a bore at is formed in a bottom portion of the main body.

11. The bicycle top cap according to claim 9, wherein the first wire guide includes a pair of recesses that are disposed along the bottom surface of the main body.

12. The bicycle top cap according to claim 11, wherein the recesses open in opposite directions of the exterior side surface of the main body.

13. The bicycle top cap according to claim 7, wherein at least one of the first and second bicycle electric devices includes an electric bicycle derailleur, and
   the electric part includes a bicycle derailleur adjustment switch configured to adjust position of the electric bicycle derailleur.

14. A bicycle top cap comprising:
   a main body configured to be disposed on an upper portion of a steering column of a bicycle frame; and
   the main body further including a first wire guide that opens in an exterior side surface of the main body, the first wire guide being configured to guide at least one wire to outside of the bicycle frame when the bicycle top cap is disposed on the bicycle frame, the first wire guide including a pair of recesses that are disposed along a bottom surface of the main body.

15. The bicycle top cap according to claim 14, wherein the recesses open in opposite directions of the exterior side surface of the main body.

16. A bicycle top cap comprising:
   a main body having an exterior bottom surface configured to be disposed on an upper portion of a steering column of a bicycle frame and being configured to cover an opening of a handlebar stem to which the steering column is attached, the main body further including at least one wire guide that is disposed in the exterior bottom surface of the main body, the at least one wire guide guiding first and second wires from inside the main body to inside of the bicycle frame when the bicycle top cap is disposed on the bicycle frame, the at least one wire guide including a pair of guide tubes; and
   an electric part disposed in the main body, the electric part including a circuit board that is connected to the first and second electrical wires the pair of guide tubes of the at least one wire guide extending downward from the exterior bottom surface of the main body to guide the first and second electrical wires to the electric part.

17. The bicycle top cap according to claim 16, wherein the circuit board is positioned parallel to the exterior bottom surface of the main body.

18. The bicycle top cap according to claim 16, further comprising
   a head cap having an abutment contacting an upper edge of the handlebar stem when the top cap is disposed on the steering column.

* * * * *